United States Patent
Oka et al.

(10) Patent No.: US 9,868,840 B2
(45) Date of Patent: Jan. 16, 2018

(54) SHAPED ARTICLE MADE OF POROUS HYDROGEL, MANUFACTURING PROCESS THEREFOR AND USE THEREOF

(71) Applicant: KURARAY CO., LTD., Kurashiki-shi (JP)

(72) Inventors: Tatsuya Oka, Kurashiki (JP); Arata Ishiodori, Kurashiki (JP); Mototsugu Yoshihara, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 257 days.

(21) Appl. No.: 14/369,794

(22) PCT Filed: Dec. 26, 2012

(86) PCT No.: PCT/JP2012/083696
§ 371 (c)(1),
(2) Date: Jun. 30, 2014

(87) PCT Pub. No.: WO2013/099968
PCT Pub. Date: Jul. 4, 2013

(65) Prior Publication Data
US 2014/0353248 A1    Dec. 4, 2014

(30) Foreign Application Priority Data

Dec. 28, 2011 (JP) .................... 2011-289050

(51) Int. Cl.
| | |
|---|---|
| *C08J 5/00* | (2006.01) |
| *C08J 9/28* | (2006.01) |
| *C02F 3/10* | (2006.01) |
| *C08K 3/20* | (2006.01) |
| *C08J 3/075* | (2006.01) |

(52) U.S. Cl.
CPC ............. *C08J 9/28* (2013.01); *C02F 3/104* (2013.01); *C02F 3/108* (2013.01); *C02F 3/109* (2013.01);
(Continued)

(58) Field of Classification Search
CPC ..... C08F 8/28; C08F 16/06; C08F 8/00; C08J 2329/04; C08J 3/075; C08J 9/28; C08L 29/04; C02F 3/108; C02F 3/104
(Continued)

(56) References Cited

U.S. PATENT DOCUMENTS 6,139,963 A    10/2000  Fujii et al.
2006/0131230 A1*  6/2006  Shao ............... B01D 61/16
                                                        210/601

FOREIGN PATENT DOCUMENTS

EP     0 845 480 A1    6/1998
JP     58-36630 A      3/1983
(Continued)

OTHER PUBLICATIONS

Abe et al, JP 2010/116439 English machine translation, May 27, 2010, pp. 1-5.*
(Continued)

*Primary Examiner* — Claire A Norris
(74) *Attorney, Agent, or Firm* — Oblon, McClelland, Maier & Neustadt, L.L.P.

(57) ABSTRACT

There is provided a shaped article made of porous hydrogel that contains a polyvinyl alcohol acetalized with a dialdehyde, wherein the shaped article after freeze-drying has a pore size of 0.1 to 50 μm. Preferably, the shaped article made of porous hydrogel further contains a water-soluble polysaccharide. Also preferably, an acetalization degree of the polyvinyl alcohol is 1 to 50 mol %. Also preferably, the shaped article made of porous hydrogel is in the form of particles with a sphere-equivalent diameter of 1 to 20 mm. Such a shaped article made of porous hydrogel exhibits high strength and good survivability of microorganisms.

3 Claims, 7 Drawing Sheets

(52) U.S. Cl.
CPC ................ C08J 3/075 (2013.01); C08K 3/20 (2013.01); *C08J 2201/026* (2013.01); *C08J 2201/0504* (2013.01); *C08J 2205/022* (2013.01); *C08J 2205/044* (2013.01); *C08J 2329/04* (2013.01); *C08J 2405/04* (2013.01); *Y02W 10/15* (2015.05); *Y10T 428/2982* (2015.01)

(58) Field of Classification Search
USPC ........................................................ 210/616
See application file for complete search history.

(56) References Cited

FOREIGN PATENT DOCUMENTS

| JP | 64-43188 A | 2/1989 |
|----|----|----|
| JP | 7-41516 A | 2/1995 |
| JP | 9-124731 A | 5/1997 |
| JP | 9-157433 A | 6/1997 |
| JP | 9-316271 A | 12/1997 |
| JP | 10-180279 A | 7/1998 |
| JP | 2001-302840 A | 10/2001 |
| JP | 2001-347286 A | 12/2001 |
| JP | 2003-170183 A | 6/2003 |
| JP | 2003-170184 A | 6/2003 |
| JP | 2004-75763 A | 3/2004 |
| JP | 2010-116439 A | 5/2010 |

OTHER PUBLICATIONS

Extended European Search Report dated Aug. 5, 2015 in Patent Application No. 12861710.7.
International Search Report dated Apr. 16, 2013 in PCT/JP2012/083696.

* cited by examiner

SHAPED ARTICLE MADE OF POROUS HYDROGEL, MANUFACTURING PROCESS THEREFOR AND USE THEREOF

TECHNICAL FIELD

The present invention relates to a shaped article made of porous hydrogel containing polyvinyl alcohol. The present invention also relates to a process for manufacturing such a shaped article made of porous hydrogel and the use thereof.

BACKGROUND ART

Gel shaped articles made of a polymer material have been intensely studied as a biocatalyst carrier, a water retention agent, a refrigerant, an alternative to a biological gel for an eye, a skin and a joint, a sustained-releasing material for a drug and a substrate in an actuator. Examples of a polymer material for these gel shaped articles include agar, alginates, carrageenan, polyacrylamides, polyvinyl alcohols (PVAs) and photocurable resins. A carrier used for treating waste water must have a higher water content, permeability for oxygen and a substrate and higher biocompatibility. A PVA is a particularly excellent material meeting these conditions.

Patent Reference Nos. 1 to 5 have described a process for manufacturing a gel shaped article as a carrier for treating waste water and a carrier for a bioreactor.

Patent Reference No. 1 has described a process wherein an aqueous mixed solution of a PVA and sodium alginate is contacted with an aqueous solution of calcium chloride to form a spherical PVA shaped article which is then frozen/thawed. Patent Reference No. 2 has described a process wherein an aqueous solution of a PVA is injected into a template, frozen and then partially dehydrated.

The processes described in Patent Reference Nos. 1 and 2 are those in which a PVA is insolubilized by forming microcrystals of a PVA by means of freezing/thawing or freeze-drying. Such physiochemical crosslinkage is, however, so weak that it can be broken by a PVA-decomposing bacteria such as Pseudomonas.

Patent Reference No. 3 has described that a PVA shaped article is produced from a PVA-containing solution, and then is contacted with an aqueous solution containing an aldehyde for crosslinking, to form a gel shaped article. Examples 1 to 4 therein specifically describe a process where a PVA shaped article is contacted with formaldehyde. However, this process requires that an aqueous solution to be contacted with a PVA shaped article contains an aldehyde, leading to a large amount of the aldehyde. Furthermore, a PVA eluted from the PVA shaped article is precipitated in a reaction bath, causing clogging of a vessel, pipes, a pump and so forth during the production process. Furthermore, shrinkage of a PVA shaped article in the course of the production process leads to reduction in a water content, that is, reduction in a microbial habitat, so that the article becomes less preferable as a carrier for treating waste water or for a bioreactor. Furthermore, Example 5 in Patent Reference No. 3 describes a process where a PVA shaped article is contacted with an aqueous solution containing glutaraldehyde, but a PVA shaped article produced by this process is not porous. Therefore, when the PVA shaped article is used as a microorganism carrier, a microbial habitat is unfavorably limited to the surface of the PVA shaped article.

Patent Reference No. 4 has described a process for producing a spherical gel shaped article wherein an aqueous mixed solution of a PVA, sodium alginate and glutaraldehyde is added dropwise to an acidic aqueous solution containing polyvalent metal ions with a pH of 3 to 5. However, when the acidic aqueous solution has a pH of 3 to 5, a reaction of a PVA with the aldehyde takes a long time, leading to the problem that a PVA and the aldehyde are eluted into an acidic aqueous solution. A PVA shaped article produced by the process described in Patent Reference No. 4 is also non-porous. Therefore, when the PVA shaped article is used as a microorganism carrier, a microbial habitat is unfavorably limited to the surface of the PVA shaped article.

Patent Reference No. 5 has described a PVA shaped article having a particle size of 1 to 20 mm and an acetalization degree of 1 to 20 mol %, which is produced by reacting polyvinyl alcohol with a dialdehyde-containing solution to form a shaped article and contacting the article with an acid having a pH of 3 or less. According to this production process, the use of glutaraldehyde leads to reduction in the amount of an aldehyde, so that the problems of brittleness and shrinkage during the production process can be improved. However, since a PVA shaped article obtained is non-porous, a microbial habitat is unfavorably limited to the surface of the PVA shaped article.

PRIOR ART REFERENCES

Patent References

Patent Reference No. 1: JP64-43188 A
Patent Reference No. 2: JP58-36630 A
Patent Reference No. 3: JP7-41516 A
Patent Reference No. 4: JP9-157433 A
Patent Reference No. 5: JP2010-116439 A

SUMMARY OF THE INVENTION

Problem to be Solved by the Invention

To solve the above problems, an objective of the present invention is to provide a shaped article made of porous hydrogel exhibiting high strength and good survivability of microorganisms. Another objective is to provide a production process whereby such a shaped article made of porous hydrogel can be stably and continuously produced. A further objective is to provide a microorganism carrier consisting of a shaped article made of porous hydrogel, a method for treating waste water by microorganisms carried on the carrier, and an apparatus for treating waste water whereby the treating method is conducted.

Means for Solving Problem

The above problems can be solved by providing a shaped article made of porous hydrogel that contains a polyvinyl alcohol acetalized with a dialdehyde, wherein the shaped article has a pore size of 0.1 to 50 μm. It is here preferable that the shaped article made of porous hydrogel further contains a water-soluble polysaccharide.

It is also preferable that an acetalization degree of the polyvinyl alcohol is 1 to 50 mol %. It is also preferable that the shaped article made of porous hydrogel is in the form of particles with a sphere-equivalent diameter of 1 to 20 mm.

The above problems can be also solved by providing a process for manufacturing the shaped article made of porous hydrogel described above, comprising gelating an aqueous solution containing a polyvinyl alcohol and a dialdehyde to form a shaped article, and acetalizing the polyvinyl alcohol with the dialdehyde. It is here preferable that the process comprises gelating an aqueous solution containing a polyvinyl alcohol, a dialdehyde and a water-soluble polysaccharide to form a shaped article, and contacting the resulting shaped article with an aqueous solution containing a metal salt in 0.2 to 10 mol/L in anion equivalent with pH of 3 or less to acetalize the polyvinyl alcohol.

The above problems can be also solved by providing a microorganism carrier consisting of the shaped article made of porous hydrogel.

The above problems can be also solved by providing a method for treating waste water, wherein waste water is processed by microorganisms carried on the carrier consisting of a shaped article made of porous hydrogel.

The above problems can be also solved by providing an apparatus for treating waste water, comprising a reaction tank containing the carrier carrying microorganisms, means for supplying waste water to the reaction tank, and means for removing processed water from the reaction tank.

Effect of the Invention

A shaped article made of porous hydrogel of the present invention exhibits high strength and good survivability of microorganisms. Furthermore, according to the manufacturing process of the present invention, such a shaped article made of porous hydrogel can be stably and continuously produced. Furthermore, there can be provided a microorganism carrier consisting of a shaped article made of porous hydrogel and a method for treating waste water wherein waste water is processed by microorganisms carried on a carrier. According to the method for treating waste water, pollution substances in waste water and the amount of waste water can be reduced, so that burden on a waste-water treatment plant and the environment can be reduced. Furthermore, there can be provided an apparatus for treating wastewater whereby the above treating method is conducted.

MODE FOR CARRYING OUT THE INVENTION

The present invention relates to a shaped article made of porous hydrogel containing a polyvinyl alcohol (PVA) acetalized with a dialdehyde. Acetalization with a dialdehyde allows a PVA to have a cross-linked structure.

A PVA as a starting material for a shaped article made of porous hydrogel is provided by polymerizing a vinyl carboxylate such as vinyl acetate followed by saponification. An average degree of polymerization is preferably 1000 or more, more preferably 1500 or more in the light of strength of a shaped article made of porous hydrogel. A saponification degree is preferably 95 mol % or more, more preferably 98 mol % or more in the light of strength of a shaped article made of porous hydrogel.

A PVA as a starting material for a shaped article made of porous hydrogel can be an unmodified PVA, and further, a variety of modified PVAs can be used without deteriorating the effects of the present invention. Examples which can be mentioned include copolymers with a carboxyl-containing monomer or its salt such as (meth)acrylic acid, maleic acid, maleic anhydride, fumaric acid, crotonic acid and itaconic acid; a vinylsulfonic-containing monomer or its salt such as sodium acrylamide-2-methylpropanesulfonate, sodium allylsulfonate and sodium vinylsulfonate; a cationic monomer such as a monomer containing a quaternary ammonium salt including (meth)acrylamide-propyl-trimethylammonium chloride; an α-olefin such as ethylene and propylene; (meth)acrylate; an amide-containing monomer such as acrylamide, dimethylacrylamide, N-methylolacrylamide and N-vinyl-2-pyrrolidone; an alkyl vinyl ether; a silyl-containing monomer such as trimethoxyvinylsilane; a hydroxy-containing monomer such as allyl alcohol, dimethylallyl alcohol and isopropenyl alcohol; an acetyl-containing monomer such as allyl acetate, dimethylallyl acetate and isopropenylallyl acetate; a halogen-containing monomer such as vinyl chloride and vinylidene chloride; and an aromatic monomer such as styrene. In the light of availability, a homopolymer of vinyl alcohol is preferably used.

Examples of a dialdehyde used in the present invention include glyoxal, maolonaldehyde, succinaldehyde, glutaraldehyde, adipaldehyde, malealdehyde, tartaraldehyde, citraldehyde, phthalaldehyde, isophthalaldehyde and terephthalaldehyde. In the light of availability, glutaraldehyde is preferable.

Herein, a PVA contained in a shaped article made of porous hydrogel preferably has an acetalization degree of 1 to 50 mol %. If a acetalization degree is more than 50 mol %, a gel is unfavorably brittle and significantly shrinked, resulting in a reduced microbial habitat. An acetalization degree is more preferably 30 mol % or less, further preferably 15 mol % or less. If an acetalization degree is less than 1 mol %, a gel may have insufficient strength. An acetalization degree is more preferably 2 mol % or more.

A shaped article made of porous hydrogel of the present invention preferably has a water content of 50 to 98% by weight. If a water content is less than 50% by weight, microorganism survivability may be reduced when a shaped article made of porous hydrogel is used as a microorganism carrier. A water content is more preferably 60% by weight or more, further preferably 80% by weight or more. If a water content is more than 98% by weight, a shaped article made of porous hydrogel has lower strength. A water content is more preferably 95% by weight or less.

The present invention is particularly characterized in that a freeze-dried product from a shaped article made of porous hydrogel has a pore size (diameter) of 0.1 to 50 μm. Here, a pore size in the present invention is a peak value in a pore size distribution as measured by a mercury porosimeter. Furthermore, "a peak value in a pore size distribution as measured by a mercury porosimeter is 0.1 to 50 μm" means that a frequency distribution curve for a logarithmic pore size in which a horizontal axis is a pore size and a vertical axis is a logarithmic differentiated pore volume has a pore-diameter peak within the range of 0.1 to 50 µm. If a peak value in a pore size distribution is less than 0.1 µm, a microbial habitat in a gel shaped article may be reduced. A peak value in a pore size distribution is preferably 0.2 µm or more, more preferably 0.5 µm or more. If a peak value in a pore size distribution is more than 50 µm, gel strength may be insufficient. A peak value in a pore size distribution is preferably 30 µm or less, more preferably 20 µm or less.

Here, a freeze-dried product used for measuring a pore size distribution described above can be obtained by freezing a shaped article made of porous hydrogel as described later in Examples, followed by vacuum drying.

In the present invention, a shaped article made of porous hydrogel can have a shape such as sphere, fiber, rod, rectangle, cylinder and column, preferably sphere. Specifically, a shape with a circularity degree of 0.7 or more is more preferable. The term, "circularity degree" as used herein, refers to an arithmetic average of ratios of (a projected area of a particle/an area of a circle with a diameter of the maximum length of a particle) as determined for a plurality of particles.

A shaped article made of porous hydrogel preferably has a particulate shape, and a sphere-equivalent diameter of the particle is preferably 1 to 20 mm, more preferably 3 to 15 mm. Herein, a sphere-equivalent diameter refers to a diameter of a sphere having a volume equal to that of a particle. When a shaped article made of porous hydrogel is used as a microorganism carrier, it is preferable that it has a particulate shape and a sphere-equivalent diameter is within the above range in the light of carrier separation and improved handleability of a carrier.

A suitable process for manufacturing a shaped article made of porous hydrogel of the present invention contains gelating an aqueous solution containing a PVA and a dialdehyde to form a gel shaped article, and acetalizing the PVA with the dialdehyde.

There are no particular restrictions to the order of the steps in the above manufacturing process. The step of gelation for forming a gel shaped article can be conducted simultaneously to the step of acetalization. Gelation for forming a gel shaped article can be conducted before acetalization. Alternatively, acetalization can be conducted before gelation. There are no particular restrictions to a mixing method of a PVA and a dialdehyde, and they can be mixed by a batchwise method using a stirrer.

It is also preferable that a shaped article made of porous hydrogel further contains a water-soluble polysaccharide. Examples of such a water-soluble polysaccharide include an alkali metal salt of alginic acid, carrageenan, mannan and chitosan. In the light of availability, sodium alginate is preferable. Sodium alginate is one of polysaccharides mainly produced by brown algae (for example, giant kelp) and consists of a sodium salt of a monosaccharide, such as α-L-guluronic acid and β-D-mannuronic acid, having a carboxylic group.

A more suitable process for manufacturing a shaped article made of porous hydrogel of the present invention contains gelating an aqueous solution containing a PVA, a dialdehyde and a water-soluble polysaccharide to form a shaped article, and contacting the resulting shaped article with an aqueous solution containing a metal salt in 0.2 to 10 mol/L in anion equivalent with a pH of 3 or less to acetalize the PVA.

First, in the step of forming a shaped article, a mixed aqueous solution of a PVA, a dialdehyde and a water-soluble polysaccharide is prepared. The mixed aqueous solution is used as a starting material for a shaped article made of porous hydrogel of the present invention. Here, the PVA, the dialdehyde and the water-soluble polysaccharide can be as described above.

A PVA concentration in the mixed aqueous solution is preferably 2 to 10% by weight. A higher PVA concentration leads to a stronger gel, but in the light of a starting material cost, a lower PVA concentration is advantageous as long as satisfactory gel strength is attained.

A dialdehyde concentration in this mixed aqueous solution is preferably 1 to 20 mol % based on the total molar number of monomers in the PVA. If an aldehyde concentration is less than 1 mol % based on the total molar number of monomers in the PVA, an acetalizing reaction inefficiently proceeds, leading to insufficient crosslinking, which may cause increase in elution of the PVA from a shaped article made of porous hydrogel. A dialdehyde concentration is more preferably 2 mol % or more, further preferably 3 mol % or more. If an aldehyde concentration is more than 20 mol % based on the total molar number of monomers in the PVA, a shaped article made of porous hydrogel may be brittle and so shrinked in the course of the manufacturing process that a water content may be reduced. When a shaped article made of porous hydrogel is used as a microorganism carrier, shrinkage of a gel shaped article may lead to reduction in microorganism survivability. Thus, in decomposition treatment of waste water, a decomposition efficiency may be reduced. A dialdehyde concentration is more preferably 10 mol % or less, further preferably 7.5 mol % or less. A dialdehyde concentration in a mixed aqueous solution within such a range allows for giving a shaped article made of porous hydrogel with higher microorganism survivability.

In the light of moldability of a gel, a water-soluble polysaccharide concentration in the mixed aqueous solution is preferably 0.2 to 4% by weight, more preferably 0.5 to 2% by weight based on the whole mixed aqueous solution.

As long as gelation and acetalization of a PVA is not inhibited, microorganisms, an enzyme, a culture medium for microorganisms, a reinforcing material, a filler for adjusting a specific gravity and so forth can be added to the mixed aqueous solution. Furthermore, it is preferable that a starch can be added to the mixed aqueous solution. Addition of a starch to the mixed aqueous solution allows for accelerating phase separation during an acetalization reaction, leading to increase in a pore size of a shaped article made of porous hydrogel. A starch concentration in the mixed aqueous solution is preferably 0.1 to 10% by weight. The starch added to the mixed aqueous solution can be an unmodified starch, and various modified starches can be used as long as the effects of the present invention are not deteriorated. Examples of a modified starch include a cross linked starch in which swelling of starch is chemically inhibited, and a heat-moisture treated starch which is physically modified.

A mixed aqueous solution prepared as described above can be contacted with an aqueous solution of a cation-containing compound to provide a gel shaped article in various shapes. Herein, contacting a mixed aqueous solution with an aqueous solution of a cation-containing compound is referred to as "first solidification", and an aqueous solution of a cation-containing compound is referred to as a "first solidification solution".

Examples of a cation include alkaline earth metal ions such as calcium, magnesium, strontium and barium ions; polyvalent metal ions such as aluminum, nickel and cerium ions; potassium ion; and ammonium ion. Among these, polyvalent metal ion is preferable and alkaline earth metal ion is more preferable. A concentration of a cation-containing compound in a first solidification solution is preferably 0.05 to 0.5 mol/L.

There are no particular restrictions to a contacting method, and a commonly used contacting method can be chosen as appropriate, including adding a mixed solution as a starting material dropwise to a first solidification solution from the air, and contacting them in a liquid phase. By adding a mixed aqueous solution dropwise to a first solidification solution, ionic bond is formed between a water-soluble polysaccharide and a cation, so that a shaped article becomes a sphere.

Subsequently, the resulting gel shaped article is contacted with an aqueous solution containing a metal salt in 0.2 to 10 mol/L in anion equivalent with a pH of 3 or less to acetalize the PVA. Herein, contacting a gel shaped article formed by the first solidification with an aqueous solution containing such an acid and a metal salt for acetalizing is referred to as "second solidification", and the aqueous solution containing an acid and a metal salt is referred to as a "second solidification solution".

In the process of acetalizing a PVA, a second solidification solution containing an acid and a metal is prepared. Examples of an acid contained in a second solidification solution include acids such as sulfuric acid, hydrochloric acid, phosphoric acid, nitric acid, acetic acid and oxalic acid and acidic salts such as sodium hydrogen sulfate and ammonium hydrogen sulfate. Since a low concentration of an acid leads to a long reaction time and elution of a PVA and a dialdehyde from a gel shaped article, a pH of the second solidification solution is preferably 3 or less, more preferably 2.5 or less, further preferably 2 or less.

Examples of a metal salt contained in a second solidification solution include sulfates, hydrochlorides, phosphates, nitrates, acetates, oxalates and tartrates, and among these, sulfates and hydrochlorides are preferable. Examples of a cationic species include alkali metals and alkaline earth metals. A concentration of a metal salt in a second solidification solution is preferably 0.2 to 10 mol/L in anion equivalent. If a concentration of a metal salt in a second solidification solution is less than 0.2 mol/L in anion equivalent, a gel shaped article may not have a porous structure, and the concentration is more preferably 0.4 mol/L or more. If a concentration of a metal salt in a second solidification solution is more than 10 mol/L in anion equivalent, scale may be formed, and the concentration is more preferably 2 mol/L or less.

During contacting a gel shaped article formed in the first solidification with a second solidification solution, a temperature of the second solidification solution is preferably 20 to 80° C. If it is lower than 20° C., the reaction takes a longer time, which may lead to elution of a PVA and an aldehyde into the second solidification solution. If the temperature is higher than 80° C., acid corrosion of a plant is unfavorably significant.

The gel shaped article formed in the first solidification is contacted with a second solidification solution to acetalize the PVA in the gel shaped article. As the acetalization reaction proceeds, the hydrophilic PVA becomes hydrophobic and phase separation is induced, forming a porous structure in the gel shaped article. The gel shaped article thus obtained can be appropriately washed to provide a shaped article made of porous hydrogel.

The shaped article made of porous hydrogel thus produced has a macroscopic three-dimensional network structure and is, therefore, elastic. Furthermore, PVA elution from the shaped article made of porous hydrogel is very small. Furthermore, shrinkage in the course of the manufacturing process is insignificant and a high water content is maintained. In the course of the production process, elution of a PVA or a dialdehyde (crosslinking agent) into a reaction bath (a first solidification solution, a second solidification solution) is very small, allowing for stable continuous production. The shaped article made of porous hydrogel thus obtained is strong enough for being resistant to deformation or damage for a long period and is resistant to water or a variety of chemicals, allowing for its continuous use. Furthermore, with good survivability of microorganisms, the article is practically very useful as a carrier for waste-water treatment and a bioreactor.

The shaped article made of porous hydrogel thus obtained can be suitably used not only as a microorganism carrier for waste-water treatment or a carrier for a biocatalyst, but also as a water retention agent, a refrigerant, an alternative to a biological gel for an eye, a skin and a joint, a sustained-releasing material for a drug and a substrate in an actuator.

A suitable embodiment of the present invention is a microorganism carrier consisting of the above shaped article made of porous hydrogel. The embodiment also consists in treating waste water by microorganisms carried on the carrier. Here, microorganisms carried on the carrier can be anaerobic or aerobic microorganisms. In particular, the above shaped article made of porous hydrogel is suitable as a microorganism carrier for anaerobic waste-water treatment. It is because microorganisms can live not only on the surface but also in the inside of the above shaped article made of porous hydrogel. The type of the microorganisms can be appropriately selected, depending on contamination degree and the type of waste water to be treated.

There are no particular restrictions to a method for carrying anaerobic microorganisms on a shaped article made of porous hydrogel; for example, a shaped article made of porous hydrogel and an anaerobic digestive sludge are mixed in a reaction tank in an apparatus for treating waste water. By mixing a shaped article made of porous hydrogel and an anaerobic digestive sludge as described above, anaerobic microorganisms contained in the anaerobic digestive sludge are carried on the shaped article made of porous hydrogel. There are also no particular restrictions to a method for adding aerobic microorganisms on a shaped article made of porous hydrogel; for example, a shaped article made of porous hydrogel and an activated sludge are added to a reaction tank in an apparatus for treating waste water. As described above, by mixing a shaped article made of porous hydrogel and an aerobic digestive sludge (activated sludge), aerobic microorganisms contained in the activated sludge are carried on the shaped article made of porous hydrogel.

Alternatively, a shaped article made of porous hydrogel can be added to an aqueous solution containing microorganisms and nutrients to give a shaped article made of porous hydrogel preliminarily carrying microorganisms, which is then added to a reaction tank in an apparatus for treating waste water. However, even when such a method is not employed, microorganisms can be adequately carried on a shaped article made of porous hydrogel of the present invention. Therefore, a method involving adding microorganisms to a reaction tank in an apparatus for treating waste water without being preliminarily carried can be suitably employed.

There are no particular restrictions to the type of waste water to be treated as long as waste water can be subjected to microbial decomposition; for example, sewage discharged from a toilet or the like, miscellaneous drainage associated with cooking, laundry and the like, industrial waste water discharged from a factory, and an plant and the like. Waste water to be treated can be a muddy fluid mainly containing solid components or a liquid mainly containing soluble components.

When microorganisms carried on a carrier are anaerobic microorganisms, the apparatus preferably has an anaerobic reaction tank containing a carrier, means for supplying waste water to the anaerobic reaction tank, and means for removing processed water from the anaerobic reaction tank. There will be described a specific example of a preferable apparatus for conducting anaerobic waste-water treatment.

Figure 1:
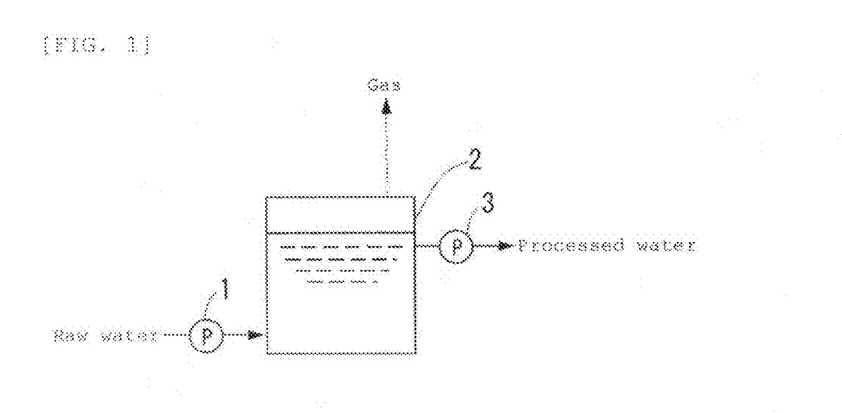
FIG. 1 shows an example of a single-tank type apparatus for treating waste water whereby anaerobic waste-water treatment is conducted.

FIG. 1 shows an example of a single-tank type anaerobic apparatus for treating waste water whereby anaerobic waste-water treatment is conducted. In FIG. 1, the anaerobic reaction tank 2 contains a shaped article made of porous hydrogel carrying anaerobic microorganisms contained in an anaerobic digestive sludge. Waste water (raw water) from households, factories, plant and so on is fed to an anaerobic reaction tank 2 via a raw water pump 1. Here, a raw-water input can be regulated by, for example, a control valve based on a flow rate determined by a flowmeter (unshown).

In the anaerobic reaction tank 2, the anaerobic microorganisms carried on the carrier decompose organic compounds such as hydrocarbons, proteins and lipids in the raw water into organic acids and the like (acid formation). Here, the interior of the anaerobic reaction tank 2 can be set at an optimal temperature for decomposition by anaerobic microorganisms, using a thermometer, a heater and so on (unshown). A pH in the anaerobic reaction tank 2 can be adjusted to an optimal pH for decomposition by anaerobic microorganisms while a pH is measured by a pH meter. In the anaerobic reaction tank 2, anaerobic microorganisms carried on the carrier further decompose organic acids, resulting in generation of gases such as methane gas and carbon dioxide (methane fermentation). These gases are discharged outside from the anaerobic reaction tank 2 via an exhaust gas line.

The raw water treated in the anaerobic reaction tank 2 is discharged as a processed water from the anaerobic reaction tank 2 via a processed-water discharging pump 3. Here, if necessary, some or all of the processed water can be returned to the anaerobic reaction tank 2 via, for example, a pump (unshown) for circulating treatment of the raw water.

Figure 2:
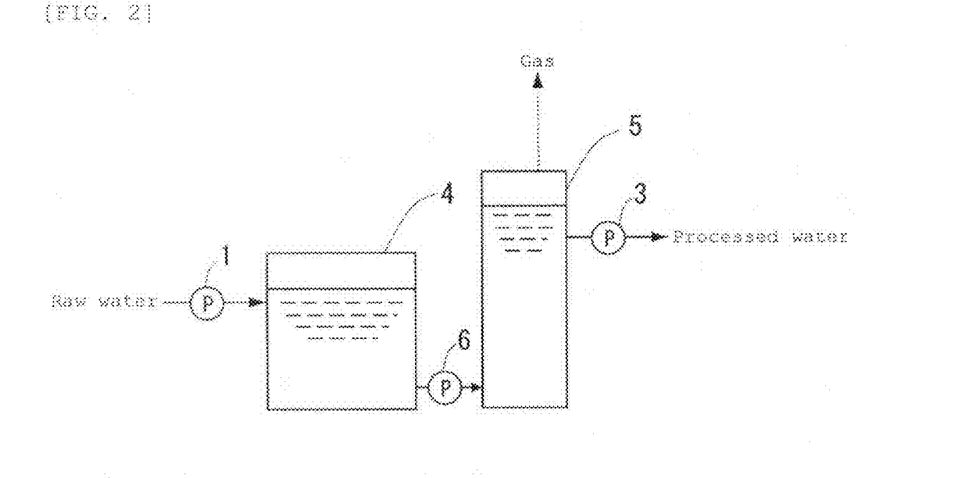
FIG. 2 shows an example of a two-tank type apparatus for treating waste water whereby anaerobic waste-water treatment is conducted.

Although the above apparatus shown in FIG. 1 is a single-tank type anaerobic apparatus for treating waste water, it can be a two-tank type anaerobic apparatus for treating waste water. FIG. 2 shows an exemplary two-tank type apparatus for treating waste water whereby anaerobic waste-water treatment is conducted. In general, in the two-tank type anaerobic apparatus for treating waste water, acid generation and fermentation are separately conducted in the two tanks.

As shown in FIG. 2, a two-tank type anaerobic apparatus for treating waste water has an acid generation tank 4 and a methane fermentation tank 5. The acid generation tank 4 and/or the methane fermentation tank 5 contains a shaped article made of porous hydrogel carrying anaerobic microorganisms. Waste water (raw water) from households, factories, plant and so on is fed first to the acid generation tank 4 via a raw water pump 1. In the acid generation tank 4, organic compounds in the raw water are decomposed into compounds with a lower molecular weight and into organic acids.

Then, the processed water containing organic acids generated in the acid generation tank 4 is fed to the methane fermentation tank 5 via a methane fermentation tank feeding pump 6. In the methane fermentation tank 5, organic acids such as acetic acid are decomposed into methane gas and carbon dioxide by methanogenic bacteria. These reaction gases are discharged from the methane fermentation tank 5 via an exhaust gas line. The processed water after treatment in the methane fermentation tank 5 is discharged from the methane fermentation tank 5 via a processed water discharge pump 3.

There will be described a preferable aspect for conducting aerobic waste-water treatment.

When microorganisms carried on a carrier are aerobic microorganisms, the apparatus preferably has an aerobic reaction tank containing a carrier, means for feeding oxygen to the aerobic reaction tank, means for feeding waste water to the aerobic reaction tank, and means for removing processed water from the aerobic reaction tank. There will be described a specific example of a preferable apparatus for conducting aerobic waste-water treatment.

Figure 3:
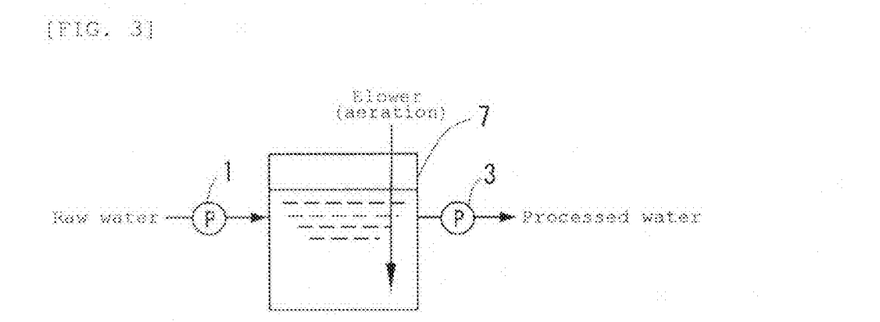
FIG. 3 shows an example of an apparatus for conducting aerobic waste-water treatment.

FIG. 3 shows an example of an apparatus for conducting aerobic waste-water treatment. In FIG. 3, the aerobic reaction tank 7 contains a shaped article made of porous hydrogel carrying aerobic microorganisms.

In the aerobic reaction tank 7, aerobic microorganisms carried on the carrier decompose organic compounds in the raw water. Furthermore, the aerobic reaction tank 7 has a blower for aerating the interior of the tank. There are no particular restrictions to the blower as long as an optimal DO (Dissolved Oxygen) concentration for decomposition by aerobic microorganisms can be retained in the aerobic reaction tank 7.

In the apparatus for treating waste water involving aerobic microorganisms as shown in FIG. 3, an input of a raw water can be also adjusted. In the aerobic reaction tank 7, a pH and a temperature can be controlled in an optimal range for decomposition by aerobic microorganisms. If necessary, some or all of the processed water can be returned to the aerobic reaction tank 7 via, for example, a pump (unshown) for circulating treatment of the raw water.

EXAMPLES

A shaped article made of porous hydrogel of the present invention will be specifically described with reference to Examples. The present invention is, however, not limited to these examples.

Example 1

Water was added to a PVA (Kuraray Co., Ltd., average degree of polymerization: 1700, saponification degree: 99.8 mol %) in such an amount that a PVA concentration became 6.0 g/L, and then the PVA was dissolved in hot water over 60 min. To the resulting aqueous PVA solution was added sodium alginate to 1 g/L, which was dissolved by stirring the mixture for 30 min. Furthermore, to the aqueous solution was added a 50% aqueous solution of glutaraldehyde to 3.7 mol % based on a molar number of the total monomers in the PVA, and then the mixture was thoroughly mixed to prepare a mixed aqueous solution. Hundred grams of the mixed aqueous solution was added dropwise to one liter of a first solidification solution consisting of a 0.1 mol/L aqueous solution of calcium chloride with stirring by a stirrer at a feed rate of 5 mL/min via a roller pump equipped with silicone tube with an inner diameter of 3.2 mm having a nozzle with an inner diameter of 2 mm at the tip. The droplets added became spheres in the aqueous solution of calcium chloride and sedimented.

Figure 4:
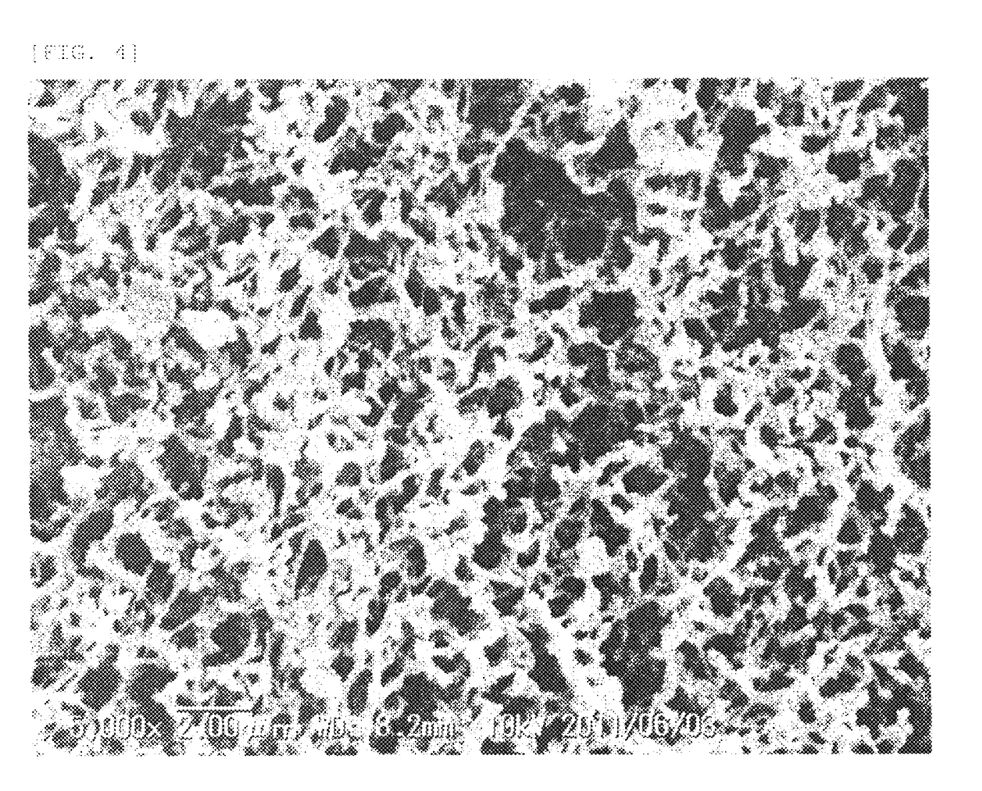
FIG. 4 is an SEM image of the surface of gel shaped article (C) in Example 1.

The spherical shaped article (A) was separated from the aqueous solution of calcium chloride, and immersed in one liter of a second solidification solution (B) (40° C., an aqueous solution containing 10 g/L of sulfuric acid and 60 g/L of sodium sulfate) for 60 min. Then, the shaped article was separated from the second solidification solution (B) and washed with water. As a result, flexible spherical gel shaped article (C) with a diameter of about 5.7 mm was obtained. After freeze-drying the gel shaped article (C), the surface of the gel shaped article (C) after gold evaporation was observed by an electron microscope. FIG. 4 shows an SEM image of the surface of the gel shaped article (C). The SEM image obtained indicate that there are many pores with a size of about 0.5 to 2 μm in the surface of the gel shaped article (C) in Example 1.

This gel shaped article (C) had a water content of 94% by weight and a PVA acetalization degree of 4 mol %. For determining physical properties of the gel shaped article (C) and the amount of foreign materials generated in the reaction solution, a pore size, a volume retention rate, a PVA elution rate, the amount of foreign materials generated in the reaction solution, strength, a TOC removal rate, a microorganism distribution and the amount of microorganisms during a biotreatment test were determined as described below. The results are summarized in Table 1.

[Pore Diameter]

Figure 5:
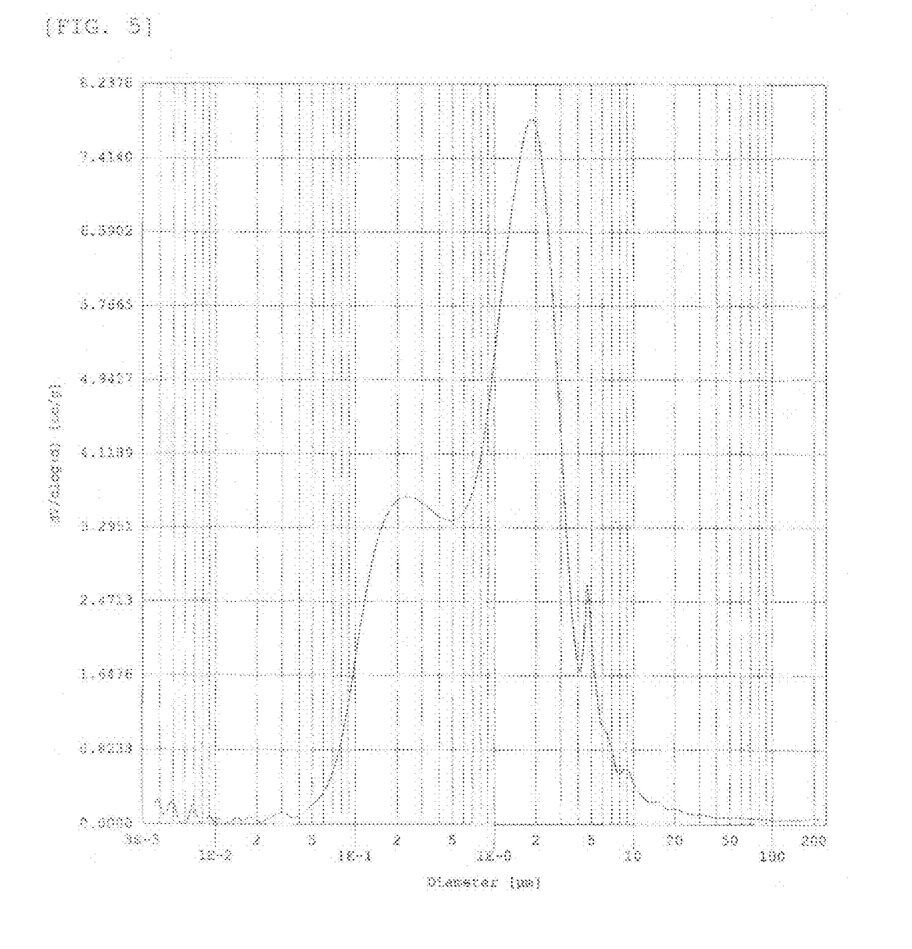
FIG. 5 shows a pore size distribution of a freeze-dried product of gel shaped article (C) in Example 1.

The gel shaped article (C) of Example 1 was frozen by liquid nitrogen and then dried at −50° C. Then, using a mercury porosimeter, a pore size (a peak value in a pore size distribution) was measured by mercury intrusion technique. Specifically, a sample dried at 70° C. was used for the measurement by mercury intrusion technique using a mercury porosimeter "PoreMaster 60GT" (from Quantachrome Instruments). The results are shown in FIG. 5.

[Volume Retention Rate]

A volume retention rate was defined by the following equation:

Volume retention rate(%)=($c/a$)×100 wherein a volume of 100 pieces of the above spherical shaped article (A) is "a" cm$^3$ and a volume of 100 pieces of the gel shaped article (C) is "c" cm$^3$. A volume retention rate of the gel shaped articles (C) in Example 1 was 105%.

[PVA Elution Rate (g-PVA/kg-Gel)]

To about 2 g of the gel shaped article (C) of Example 1 was added 9-fold weight of water, and the mixture was pulverized using a homogenizer and then autoclaved at 121° C. for 15 min. A supernatant was collected and measured for a PVA concentration. A PVA elution rate was expressed as the amount per 1 kg of the gel shaped article (C). A PVA elution rate of the gel shaped article (C) of Example 1 was 0.01 (g-PVA/kg-gel).

[Amount of Foreign Materials Generated in a Reaction Solution (g-SS/kg-PVA)]

The amount of foreign materials generated in the reaction solution was evaluated by filtrating a second solidification solution (B) after the reaction through a 1 micron filter and then measuring a weight of a solid after drying at 105° C. for one hour (SS; Suspended Solids). The amount of foreign materials generated in the reaction solution as used herein is the amount of foreign materials generated in a reaction solution for chemical cross linking (acetalization) of the PVA. The amount of foreign materials was evaluated by filtrating a second solidification solution (B) after the reaction through a 1 micron filter and then measuring a weight of a solid after drying at 105° C. for one hour (SS). The amount of foreign materials generated in the reaction solution was expressed as the amount of foreign materials generated per 1 kg of the PVA used. As a result, no solids (SS) were observed.

[Strength]

One gel shaped article (C) was placed as a flat piece. One kg load was applied on the article from above for 30 sec and then shape change after removing the load was visually observed and evaluated in accordance with the following evaluation criteria.

Evaluation Criteria

A: Spherical shape is maintained.

B: The article becomes flat but the spherical shape is recovered.

C: The article is broken.

The gel shaped article (C) of Example 1 was evaluated as A, that is, it was found that the article maintains a spherical shape.

[TOC(Total Organic Carbon)removal rate(mg-TOC/(L-gel·h))]

In a gel shaped article in which microorganism survivability is excellent, a TOC removal rate is high. Thus, a TOV removal rate was determined as an indicator for microorganism survivability in a gel shaped article. Specifically, 100 g of the gel shaped article (C) of Example 1 was immersed in a sludge in a waste-water treating facility in the Kurashiki Plant of Kuraray Co., Ltd. for 3 days, and then the gel shaped article (C) was removed. Then, to the article was added water to one liter and a waste water which had been adjusted to TOC 500 mg/L was fed to an aerated tank, and a TOC removal rate per a gel weight was determined. As a result, a TOC removal rate was 2054 mg-TOC/(L-gel·h).

[Microorganism Distribution (Distribution of Microorganisms During a Biotreatment Test)]

Figure 6:
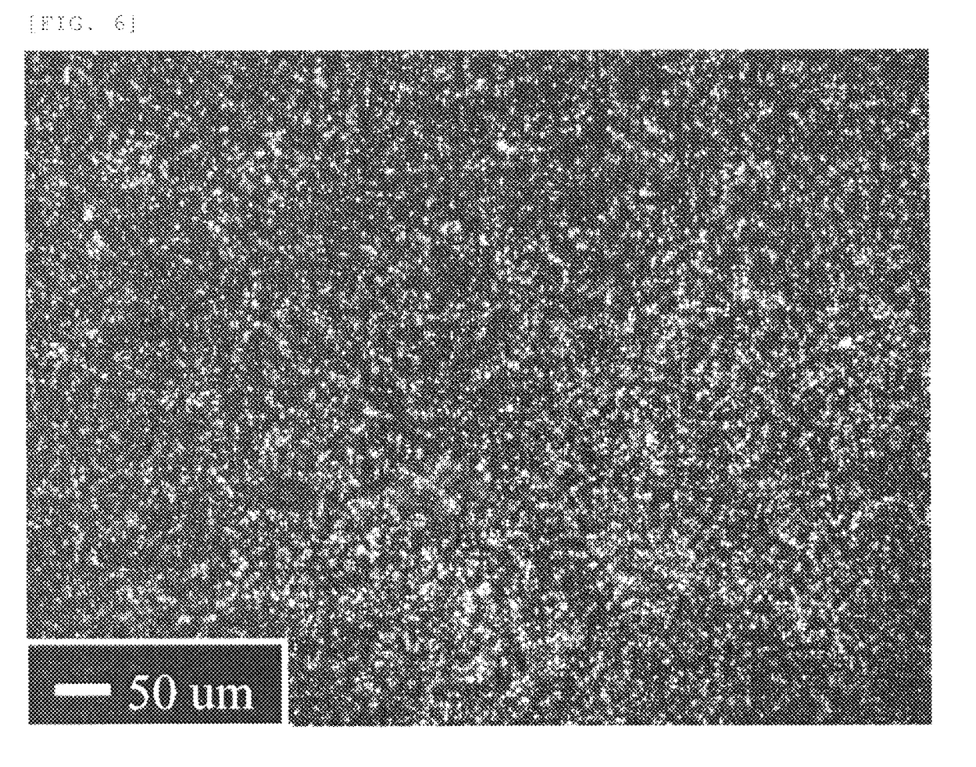
FIG. 6 is an image of DAPI-stained gel shaped article (C) of Example 1.

The gel shaped article (C) of Example 1 provided for biotreatment was stained with DAPI (4',6-DiAmidino-2-PhenylIndole), and a distribution of stained microorganisms was observed by fluorescence microscopy. FIG. 6 is an image of the central part of the DAPI-stained gel shaped article (C) of Example 1. Then, from the image obtained, a distribution of microorganisms in the gel shaped article (C) was determined in accordance with the following evaluation criteria.

Evaluation Criteria

A: Microorganisms are distributed not only in the outside of the gel but also in its inside.

B: Microorganisms are not distributed in the inside of the gel.

The gel shaped article (C) of Example 1 was evaluated as "A". Furthermore, as shown in FIG. 6, many regions of stained microorganisms were observed in the central part.

[Amount of Microorganisms (the Amount of Microorganisms During a Biotreatment Test)]

The gel shaped article (C) of Example 1 provided for biotreatment was stained with DAPI, observed by fluorescence microscopy, and then analyzed for luminosity distribution by an image analyzer "Image-Pro plus" (from Media Cybernetics, Inc.). A range of luminosity distribution was 0 to 255, and the higher the value is, the brighter the image is and the more the amount of microorganisms is.

Evaluation Criteria

A: Luminosity distribution was in the range of 200 to 255, and a large amount of microorganisms was observed.

B: Luminosity distribution was 100 to 150, and a small amount of microorganisms were observed.

The gel shaped article (C) of Example 1 was evaluated as A.

Example 2

A gel shaped article (C) was produced as described in Example 1, except that in a second solidification solution (B), a concentration of sulfuric acid was 30 g/L and a concentration of sodium sulfate was 150 g/L. As a result, a flexible spherical gel shaped article (C) with a diameter of about 5.3 mm was obtained. Various measurements as described in Example 1 were conducted for the resulting gel shaped article (C). The results are shown in Table 1.

Example 3

Figure 8:
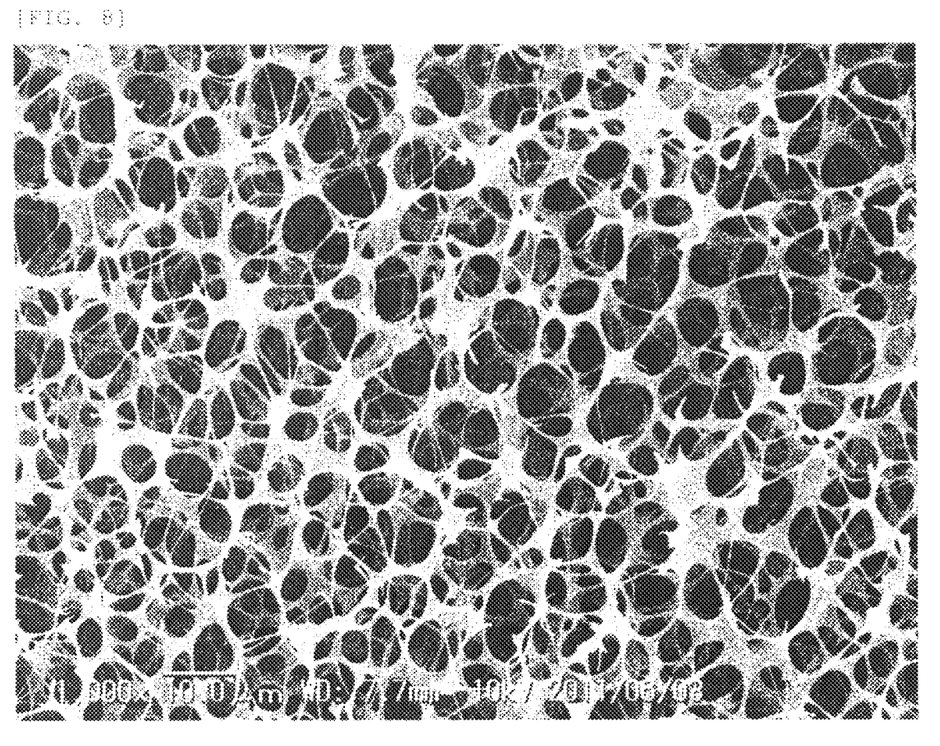
FIG. 8 is an SEM image of the surface of gel shaped article (C) in Example 3.

A gel shaped article (C) was produced as described in Example 1, except that to a mixed aqueous solution, modified starch was added to 0.3 g/L, and in a second solidification solution (B), a concentration of sulfuric acid was 30 g/L and a concentration of sodium sulfate was 150 g/L. As a result, a flexible spherical gel shaped article (C) with a diameter of about 5.3 mm was obtained. FIG. 8 shows an SEM image of the surface of the gel shaped article (C) in Example 3. The SEM image indicates that many pores with a size of 2 to 20 µm are present in the surface of the gel shaped article (C) in Example 3. Various measurements as described in Example 1 were conducted for the resulting gel shaped article (C). The results are shown in Table 1.

Example 4

A gel shaped article (C) was produced as described in Example 1, substituting an aqueous solution containing 30 g/L of hydrochloric acid and 150 g/L of sodium chloride at 40° C. for the second solidification solution (B). As a result, a flexible spherical gel shaped article (C) with a diameter of about 5.2 mm was obtained. Various measurements as described in Example 1 were conducted for the resulting gel shaped article (C). The results are shown in Table 1.

Example 5

A gel shaped article (C) was produced as described in Example 1, except that to an aqueous PVA solution, a 50% aqueous solution of glutaraldehyde was added to 2.2 mol % based on the total molar number of monomer units in a PVA, and in the second solidification solution (B), a concentration of sulfuric acid was 30 g/L and a concentration of sodium sulfate was 150 g/L. As a result, a flexible spherical gel shaped article (C) with a diameter of about 6.2 mm was obtained. Various measurements as described in Example 1 were conducted for the resulting gel shaped article (C). The results are shown in Table 1.

Example 6

A gel shaped article (C) was produced as described in Example 1, except that to an aqueous PVA solution, a 50% aqueous solution of glutaraldehyde was added to 10.0 mol % based on the total molar number of monomer units in a PVA, and in the second solidification solution (B), a concentration of sulfuric acid was 30 g/L and a concentration of sodium sulfate was 150 g/L. As a result, a flexible spherical gel shaped article (C) with a diameter of about 4.7 mm was obtained. Various measurements as described in Example 1 were conducted for the resulting gel shaped article (C). The results are shown in Table 1.

Comparative Example 1

Figure 7:
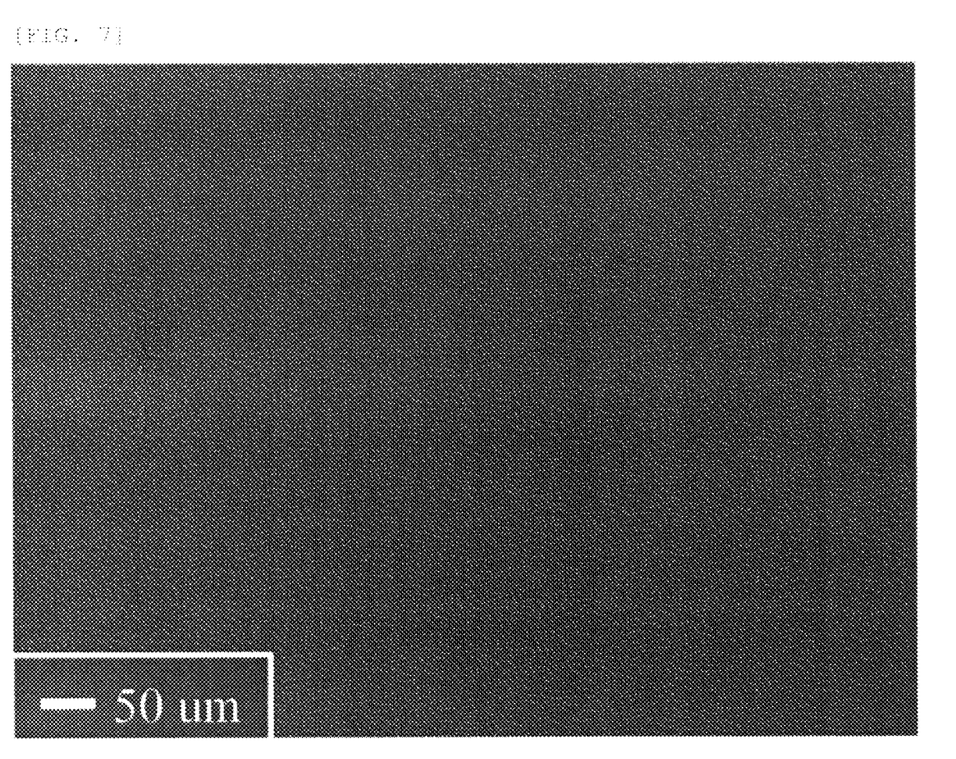
FIG. 7 is an image of DAPI-stained gel shaped article (C) of Comparative Example 1.
Figure 9:
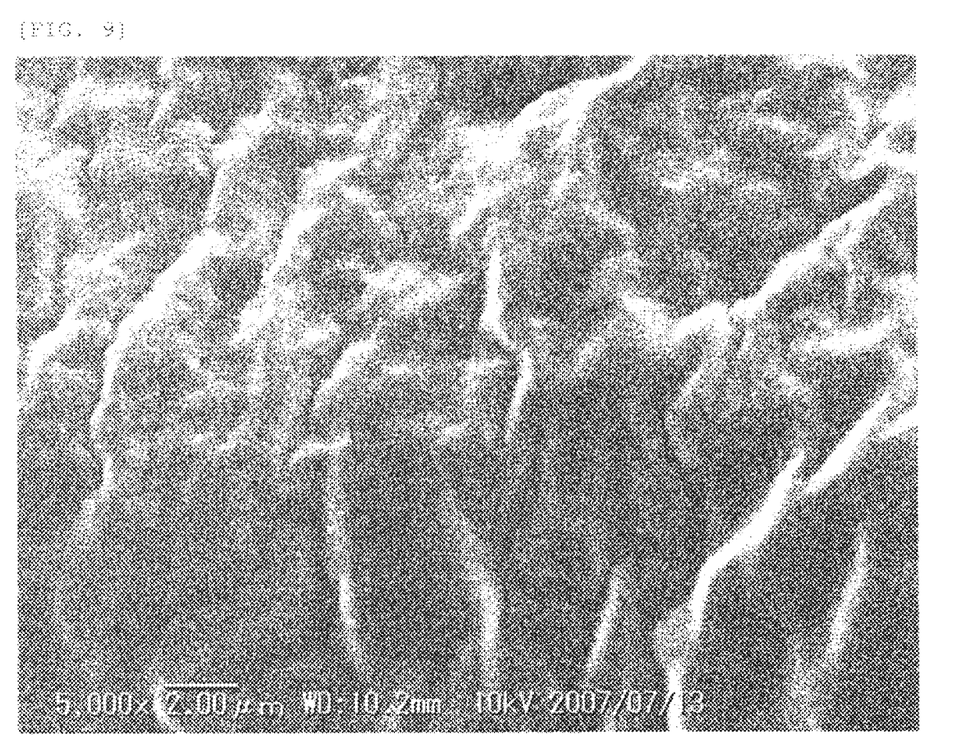
FIG. 9 is an SEM image of the surface of gel shaped article (C) in Comparative Example 1.

A gel shaped article (C) was produced as described in Example 1, except for using a second solidification solution (B) at 40° C. which contained sulfuric acid at a concentration of 50 g/L and was free from sodium sulfate. As a result, a flexible spherical gel shaped article (C) with a diameter of about 5.2 mm was obtained. FIG. 9 shows an SEM image of the surface of the gel shaped article (C) in Comparative Example 1. The SEM image indicates that no pores are present in the surface of the gel shaped article (C) in Comparative Example 1. Various measurements as described in Example 1 were conducted for the resulting gel shaped article (C). The results are shown in Table 1. The gel shaped article (C) of Comparative Example 1 provided for biotreatment was stained with DAPI (4',6-DiAmidino-2-PhenylIndole), and a distribution of stained microorganisms was observed by fluorescence microscopy. FIG. 7 is an image of the central part of the DAPI-stained gel shaped article (C) of Comparative Example 1. Then, from the image obtained, a distribution of microorganisms in the gel shaped article (C) was determined in accordance with the evaluation criteria described above, and the gel shaped article (C) of Comparative Example 1 was evaluated as B. Furthermore, as seen in FIG. 7, staining of microorganisms was not observed in the central part, indicating that in the gel of Comparative Example 1, microorganisms are absent in the central part.

Comparative Example 2

Water was added to a PVA (Kuraray Co., Ltd., average degree of polymerization: 1700, saponification degree: 99.8 mol %) in such an amount that a PVA concentration became 6.0 g/L, and then the PVA was dissolved by heating at 121° C. for 30 min in autoclave. To the resulting aqueous PVA solution was added sodium alginate to 1.0%, and the mixture was stirred for 30 min for dissolving the salt in the absence of glutaraldehyde. Hundred grams of the mixed aqueous solution was added dropwise to one liter of a 0.1 mol/L aqueous solution of calcium chloride with stirring by a stirrer at a feed rate of 5 mL/min via a roller pump equipped with a silicone tube with an inner diameter of 3.2 mm having a nozzle with an inner diameter of 2 mm at the tip. The droplets added became spheres in the aqueous solution of calcium chloride and sedimented.

The spherical shaped article (A) was separated from the aqueous solution of calcium chloride, and immersed in one liter of a second solidification solution (B) (40° C., a mixed aqueous solution containing 30 g/L of formaldehyde, 200 g/L of sulfuric acid and 80 g/L of sodium sulfate) for 60 min. Then, the shaped article was separated from the second solidification solution (B) and washed with water. As a result, flexible spherical gel shaped article (C) with a diameter of about 4 mm was obtained. Various measurements as described in Example 1 were conducted for the resulting gel shaped article (C) of Comparative Example 2. The results are shown in Table 1.

Comparative Example 3

A gel shaped article (C) was produced as described in Comparative Example 2, except that a spherical shaped article (A) was separated from an aqueous solution of calcium chloride and then without being immersed in a second solidification solution (B), frozen at −27±3° C. for 20 hours and then thawed at an ambient temperature. As a result, a spherical gel shaped article (C) with a diameter of about 5.5 mm was obtained. Various measurements as described in Example 1 were conducted for the resulting gel shaped article (C). The results are shown in Table 1.

Comparative Example 4

A gel shaped article (C) was produced as described in Comparative Example 2, except that a spherical shaped article (A) was separated from an aqueous solution of calcium chloride and then immersed in one liter of a second solidification solution (B) (40° C., an aqueous solution containing 50 g/L of sulfuric acid and 5 g/L glutaraldehyde) for 60 min. As a result, a spherical gel shaped article (C) with a diameter of about 3.6 mm was obtained. Various measurements as described in Example 1 were conducted for the resulting gel shaped article (C). The results are shown in Table 1.

TABLE 1

|  |  | Example 1 | Example 2 | Example 3 | Example 4 | Example 5 | Example 6 |
|---|---|---|---|---|---|---|---|
| Mixed aqueous solution | PVA (g/L) | 6 | 6 | 6 | 6 | 6 | 6 |
|  | Glutaraldehyde (g/L) | 0.5 | 0.5 | 0.5 | 0.5 | 0.3 | 1.4 |
|  | Sodium alginate (g/L) | 1 | 1 | 1 | 1 | 1 | 1 |
|  | Starch (g/L) | 0 | 0 | 0.3 | 0 | 0 | 0 |
| First solidification solution (A) | Calcium chloride (mol/L) | 0.1 | 0.1 | 0.1 | 0.1 | 0.1 | 0.1 |
| Second solidification solution (B) | Acid | Sulfuric acid (g/L) | 10 | 30 | 30 | 0 | 30 | 30 |
|  |  | Hydrochloric acid (g/L) | 0 | 0 | 0 | 30 | 0 | 0 |
|  | Metal salt | Sodium sulfate (g/L) | 60 | 150 | 150 | 0 | 150 | 150 |
|  |  | Sodium chloride (g/L) | 0 | 0 | 0 | 150 | 0 | 0 |
|  |  | Formaldehyde (g/L) | 0 | 0 | 0 | 0 | 0 | 0 |
|  |  | Glutaraldehyde (g/L) | 0 | 0 | 0 | 0 | 0 | 0 |
|  | pH |  | 0.7 | 0.2 | 0.2 | −0.2 | 0.2 | 0.2 |
| Sphere-equivalent diameter (mm) |  | 5.7 | 5.3 | 5.3 | 5.2 | 6.2 | 4.7 |
| Water content (% by weight) |  | 94 | 93 | 93 | 92 | 95 | 91 |
| Vinyl alcohol unit content (mol %) |  | 96 | 96 | 96 | 96 | 98 | 90 |
| Acetalization degree (mol %) |  | 4 | 4 | 4 | 4 | 2 | 10 |
| Pore size (μm) |  | 2 | 5 | 15 | 2 | 10 | 1 |
| Volume retention rate (%) |  | 105 | 90 | 90 | 85 | 124 | 70 |
| PVA elution rate (g-PVA/kg-gel) |  | 0.01 | 0.01 | 0.01 | 0.01 | 0.01 | 0.01 |
| Amount of foreign materials generated in the reaction solution (g-SS/kg-PVA) |  | 0 | 0 | 0 | 0 | 0 | 0 |
| Strength |  | A | A | A | A | B | C |
| TOC removal rate (mg-TOC/(L-gel · h)) |  | 2054 | 2125 | 2039 | 2132 | 1995 | 2102 |
| Microorganism distribution |  | A | A | A | A | A | A |
| Microorganism amount |  | A | A | A | A | A | A |

|  |  |  | Comparative Example 1 | Comparative Example 2 | Comparative Example 3 | Comparative Example 4 |
|---|---|---|---|---|---|---|
| Mixed aqueous solution | PVA (g/L) |  | 6 | 6 | 6 | 6 |
|  | Glutaraldehyde (g/L) |  | 0.5 | 0 | 0 | 0 |
|  | Sodium alginate (g/L) |  | 1 | 1 | 1 | 1 |
|  | Starch (g/L) |  | 0 | 0 | 0 | 0 |
| First solidification solution (A) | Calcium chloride (mol/L) |  | 0.1 | 0.1 | 0.1 | 0.1 |
| Second solidification solution (B) | Acid | Sulfuric acid (g/L) | 50 | 200 | — | 50 |
|  |  | Hydrochloric acid (g/L) | 0 | 0 | — | 0 |
|  | Metal salt | Sodium sulfate (g/L) | 0 | 80 | — | 0 |
|  |  | Sodium chloride (g/L) | 0 | 0 | — | 0 |
|  |  | Formaldehyde (g/L) | 0 | 30 | — | 0 |
|  |  | Glutaraldehyde (g/L) | 0 | 0 | — | 5 |
|  | pH |  | 0.0 | −0.6 | — | 0.0 |
| Sphere-equivalent diameter (mm) |  |  | 5.2 | 4 | 5.5 | 3.6 |
| Water content (% by weight) |  |  | 92 | 89 | 94 | 78 |
| Vinyl alcohol unit content (mol %) |  |  | 96 | 50 | 100 | 60 |
| Acetalization degree (mol %) |  |  | 4 | 50 | 0 | 40 |
| Pore size (μm) |  |  | no pore | 10 | 4 | no pore |
| Volume retention rate (%) |  |  | 85 | 60 | 100 | 30 |
| PVA elution rate (g-PVA/kg-gel) |  |  | 0.01 | 0.01 | 690 | 0.01 |
| Amount of foreign materials generated in the reaction solution (g-SS/kg-PVA) |  |  | 0 | 15 | — | 0 |
| Strength |  |  | C | A | C | C |
| TOC removal rate (mg-TOC/(L-gel · h)) |  |  | 1203 | 1652 | 673 | 130 |
| Microorganism distribution |  |  | B | A | A | C |
| Microorganism amount |  |  | B | B | B | B |

As shown in Table 1, in a gel shaped article (C) of Examples 1 to 6 meeting the constitutional requirement of the present invention, a porous structure was formed in the shaped article. It is found that microorganism survivability was high in the gel shaped article (C) of Examples 1 to 6. In contrast, it is found that as seen from Comparative Example 1, a porous structure was not formed in a shaped article when a second solidification solution did not contain a metal salt, leading to unsatisfactory strength, microorganism distribution and microorganism amount. As seen from Comparative Example 2, when a mixed aqueous solution did not contain glutaraldehyde and acetalization was conducted with formaldehyde in a second solidification solution, a volume retention rate was significantly reduced, a microorganism amount was reduced and foreign materials were generated in a solidification solution. Furthermore, as seen in Comparative Example 3, it is found that in a gel shaped article (C) obtained after freezing/thawing without acetalization, a PVA was eluted out, leading to unsatisfactory strength and microorganism amount. Furthermore, as seen from Comparative Example 4, when a mixed aqueous solution did not contain glutaraldehyde and acetalization was conducted with glutaraldehyde in the second solidification solution, a porous structure was not formed and the resulting gel was brittle.

There will be specifically described examples of wastewater treatment using a shaped article made of porous hydrogel of the present invention as a microorganism carrier.

Example 7

An anaerobic waste-water treatment test was conducted using an anaerobic apparatus for treating waste water shown in FIG. 1. Specifically, using a waste-water treatment testing apparatus consisting an anaerobic reaction tank 2 having a volume of 8 L, an anaerobic waste-water treatment test was conducted for an actual waste water from a food company. A shaped article made of porous hydrogel of Example 1 was charged to 30% by volume of the tank volume. Furthermore, to the tank was added an anaerobic digestive sludge to such an amount that a concentration of MLSS (Mixed Liquor Suspended Solids) was 5000 mg/L. Operation was initiated with a waste-water load, that is, 5000 mg/L of CODcr ((Chemical Oxygen Demand) Cr, chemical oxygen demand when potassium dichromate is used as an oxidizing agent) and a raw-water amount of 1.2 L/day. Then, a flow rate of the raw water was increased stepwise. A load increase rate was 20% to a volumetric load of the previous step. Consequently, with a raw-water flow rate of 96 L/day and a CODcr volumetric load of 60 kg/m$^3$·day, a CODcr removal rate was 80%, and an organic-acid concentration in a methane fermentation tank was consistently much less than 500 mg/L as a control value. Its biotreatment performance was very satisfactory. Here, a carrier in the anaerobic reaction tank 2 was collected and a thin-film section around the center of the carrier was prepared. Microorganisms living in the carrier were stained by FISH (Fluorescence In Situ Hybridization) technique and observed by fluorescence microscopy. It was consequently observed that acidogenic bacteria and methanogenic bacteria coexisted in the carrier.

Example 8

Example 8 is an example of an aerobic waste-water treatment test using an aerobic apparatus for treating waste water shown in FIG. 3. Specifically, using a waste-water treatment testing apparatus consisting an aerobic reaction tank 7 having a volume of 2 L, an aerobic waste-water treatment test was conducted for an actual waste water from a chemical company. A shaped article made of porous hydrogel of Example 1 was charged to 10% by volume of the tank volume. Furthermore, to the tank was added a sludge to such an amount that a concentration of MLSS was 5000 mg/L. Operation was initiated with a waste-water load, that is, 1000 mg/L of BOD (Biochemical Oxygen Demand) and a raw-water amount of 0.8 L/day. Then, a flow rate of the raw water was stepwise increased. The criterion of a load increase was 80% or more of a BOD removal rate, and a load increase rate was 20 to 40% to a volumetric load of the previous step. Consequently, with a raw-water flow rate of 0.8 to 6 L and a BOD volumetric load of 0.4 to 3 kg/m$^3$·day, a BOD removal rate was substantially consistently 80%, and its biotreatment performance was very good.

Comparative Example 5

Comparative Example 5 is an example of an anaerobic waste-water treatment using a gel shaped article of Comparative Example 1 as a microorganism carrier. Using an anaerobic apparatus for treating waste water shown in FIG. 1, a gel shaped article of Comparative Example 1 was charged to 30% by volume of the tank volume. A tank volume and an anaerobic digestive sludge concentration in an initial input, the type of waste water and a procedure of increasing a waste water load were as described in Example 1. Operation was initiated with a waste-water load, that is, 5000 mg/L of CODcr and a raw-water amount of 1.2 L/day. Subsequently, a raw-water flow rate was increased stepwise. A load increase rate was 20% to a volumetric load of the previous step. Consequently, with a raw-water flow rate of 16 L/day and a CODcr volumetric load of 10 kg/m$^3$·day, a CODcr removal rate was 80%, and an organic-acid concentration in a methane fermentation tank 5 was consistently much less than 500 mg/L as a control value, and biotreatment performance was satisfactory. However, when a flow rate was increased to 18 L/day, an organic-acid concentration in the tank was increased to 1000 mg/L, which was over the control value, and a CODcr removal rate was reduced to 60%, so that a load could not be increased. Here, a carrier in the tank was collected and a thin-film section around the center of the carrier was prepared. Microorganisms living in the carrier were stained by FISH technique and observed by fluorescence microscopy. Consequently, no microorganisms were observed in the carrier, indicating that microorganisms lived only in the carrier surface.

Comparative Example 6

Comparative Example 6 is an example of anaerobic waste-water treatment using a gel shaped article of Comparative Example 2 as a microorganism carrier. Using an anaerobic apparatus for treating waste water shown in FIG. 1, a gel shaped article of Comparative Example 2 was charged to 30% by volume of the tank volume. Operation was initiated with a waste-water load, that is, 5000 mg/L of CODcr and a raw-water amount of 1.2 L/day. Subsequently, a raw-water flow rate was increased stepwise. A load increase rate was 20% to a volumetric load of the previous step. Consequently, with a raw-water flow rate of 32 L/day and a CODcr volumetric load of 20 kg/m$^3$·day, biotreatment performance was satisfactory. However, when a flow rate was increased to 38 L/day, an organic-acid concentration in the tank was increased to 1000 mg/L, which was over the control value, and a CODcr removal rate was reduced to 50%, so that a load could not be increased. Here, a carrier in the anaerobic reaction tank 2 with a CODcr volumetric load of 20 kg/m³·day was collected and a thin-film section around the center of the carrier was prepared. Microorganisms living in the carrier were stained by FISH technique and observed by fluorescence microscopy. It was consequently observed that acidogenic bacteria and methanogenic bacteria coexisted in the carrier, but from a fluorescence intensity, bacterial number was significantly smaller than the carrier of Example 7.

Comparative Example 7

Comparative Example 7 is an example of performing an anaerobic waste-water treatment test without a carrier in a tank, using an anaerobic apparatus for treating waste water shown in FIG. 2. Specifically, using a two-tank type wastewater treatment test apparatus consisting of an acid fermentation tank 4 with a volume of 2 L and a methane fermentation tank 5 with a volume of 8 L, an aerobic waste-water treatment test was conducted for an actual waste water. In a methane fermentation tank 5, a granule sludge was charged to 20% of the tank volume at the initial stage. The type of waste water was as described in Example 1. A raw water supplied was diluted to such a level that a CODcr was 5000 mg/L, and a control value of an organic-acid concentration for water discharged from the methane fermentation tank 5 was 300 mg/L or less. Operation was initiated at an initial raw-water flow rate of 1.2 L/day. Subsequently, a raw-water flow rate was increased stepwise. Consequently, treatment performance was stable to a raw-water flow rate of 32 L/day and a CODcr volumetric load of 20 kg/m³·day. However, when a raw-water flow rate was further increased, an organic-acid concentration in the methane fermentation tank 5 was increased, so that treatment was terminated. Furthermore, an anaerobic treatment test was repeated in a manner that a raw water was introduced not in an acid generation tank 4 but directly in a methane fermentation tank 5, without changing the type of waste water and a waste-water load. However, from the time that a raw-water flow rate exceeded 5 L/day, an organic-acid concentration in the tank was increased. The maximum CODcr volumetric load of 5 kg/m³·day was the upper limit.

Comparative Example 8

Comparative Example 8 was an example of performing aerobic waste-water treatment using a gel shaped article of Comparative Example 1 as a microorganism carrier. Using the aerobic apparatus for treating waste water shown in FIG. 3, a gel shaped article of Comparative Example 1 was charged to 10% by volume of the tank volume. Consequently, with a raw-water flow rate of 0.8 to 2 L/day and a BOD volumetric load of 0.4 to 1 kg/m³·day, a BOD removal rate was generally consistently 80% and biotreatment performance was very satisfactory. However, with a raw-water flow rate of 2.6 L/day and a BOD volumetric load of 1.3 kg/m³·day, a BOD removal rate was reduced to 60%, so that treatment was terminated.

Comparative Example 9

Comparative Example 9 was an example of performing aerobic waste-water treatment using a gel shaped article of Comparative Example 2 as a microorganism carrier. Using the aerobic apparatus for treating waste water shown in FIG. 3, a gel shaped article of Comparative Example 2 was charged to 10% by volume of the tank volume. A tank volume and a sludge concentration in an initial input, the type of wastewater and a procedure of increasing a waste water load were as described in Example 8. Consequently, with a raw-water flow rate of 0.8 to 2 L/day and a BOD volumetric load of 0.4 to 1 kg/m³·day, a BOD removal rate was generally consistently 80% and biotreatment performance was very satisfactory. However, with a raw-water flow rate of 2.6 L/day and a BOD volumetric load of 1.3 kg/m³·day, a BOD removal rate was reduced to 60%, so that treatment was terminated.

EXPLANATION OF REFERENCES

1: Raw water pump
2: Anaerobic reaction tank
3: Processed-water discharge pump
4: Acid generation tank
5: Methane fermentation tank
6: Methane fermentation tank feeding pump
7: Aerobic reaction tank

The invention claimed is:

1. A process for manufacturing a shaped article made of a porous hydrogel that comprises a polyvinyl alcohol acetalized with a dialdehyde, the process comprising
preparing a mixed aqueous solution of a polyvinyl alcohol, a dialdehyde and a water-soluble polysaccharide,
contacting the mixed aqueous solution with an aqueous solution of a cation-containing compound,
gelating the mixed aqueous solution to form a shaped article, and
contacting the resulting shaped article with an aqueous solution comprising a metal salt in 0.2 to 10 mol/L in anion equivalent with a pH of 3 or less to acetalize the polyvinyl alcohol,
wherein the shaped article has a pore size of 0.1 to 50 μm and an acetalization degree of the polyvinyl alcohol is 1 to 15 mol %.

2. The process as claimed in claim 1, wherein an acetalization degree of the polyvinyl alcohol is from 2 to 15 mol %.

3. The process as claimed in claim 1, wherein the shaped article is in the form of particles with a sphere-equivalent diameter of 1 to 20 mm.

* * * * *